US008774173B2

(12) United States Patent
Aghili et al.

(10) Patent No.: US 8,774,173 B2
(45) Date of Patent: Jul. 8, 2014

(54) PROVIDING CIRCUIT SWITCHED OPERATION IN AN ENHANCED UNIVERSAL TERRESTRIAL RADIO ACCESS NETWORK

(75) Inventors: Behrouz Aghili, Commack, NY (US); Rajat P. Mukherjee, San Francisco, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/572,113

(22) Filed: Aug. 10, 2012

(65) Prior Publication Data

US 2012/0307735 A1 Dec. 6, 2012

Related U.S. Application Data

(63) Continuation of application No. 12/506,493, filed on Jul. 21, 2009, now Pat. No. 8,243,725.

(60) Provisional application No. 61/088,397, filed on Aug. 13, 2008.

(51) Int. Cl.
*H04L 12/66* (2006.01)
*H04L 1/00* (2006.01)
*H04L 12/26* (2006.01)

(52) U.S. Cl.
USPC .......................... 370/354; 370/225; 370/228

(58) Field of Classification Search
CPC ... H04L 45/28; H04L 45/22; H04L 29/06027; H04L 49/25
USPC ................................. 370/225, 228, 352–356
See application file for complete search history.

(56) References Cited

U.S. PATENT DOCUMENTS

| 8,149,820 | B2 | 4/2012 | Shaheen |
| 2010/0020775 | A1 | 1/2010 | Tomizu |
| 2010/0302937 | A1 | 12/2010 | Hu et al. |

FOREIGN PATENT DOCUMENTS

| EP | 1734782 A1 | 12/2006 |
| WO | 2006/110158 | 10/2006 |
| WO | 2008/088258 | 7/2008 |

OTHER PUBLICATIONS

Motorola, "Correction of flows for call termination in idle mode," 3GPP TSG-SA2 Meeting #66, S2-084825 (Jun. 23-27, 2008).
NTT DoCoMo et al., "CS Fallback Work Item Description", 3GPP TSG SA WG2 Meeting #62, Tdoc. No. S2-080861, Agenda item 08.11, (Marina Del Ray, California, USA, Jan. 14-18, 2008).
Samsung et al., "Combined TA / LA Update Procedure," 3GPP TSG SA WG2 Meeting #64, TD S2-082929 (Apr. 7-11, 2008).
Samsung, "Combined TA / LA Update Procedure," 3GPP TSG SA WG2 Meeting #63, TDq S2-081478.
Third Generation Partnership Project, "Technical Specification Group Services and System Aspects; General Packet Radio Service (GPRS); Service decription; Stage 2 (Release 7)," 3GPP TS 23.060, V7.7.0, (Jun. 2008).

(Continued)

*Primary Examiner* — Ronald Abelson
(74) *Attorney, Agent, or Firm* — Volpe and Koenig, P.C.

(57) ABSTRACT

A wireless transmit/receive unit (WTRU), supporting Long Term Evolution (LTE), to perform circuit switched (CS) fallback is provided. The WTRU may receive via a packet switched (PS) radio access technology (RAT) a paging message including an International Mobile Subscriber Identity (IMSI). The paging message may have a domain indicator indicating that the paging message is from a CS network. The WTRU may fallback to CS and subsequently use the IMSI.

4 Claims, 11 Drawing Sheets

(56) References Cited

OTHER PUBLICATIONS

Third Generation Partnership Project, "Technical Specification Group Services and System Aspects; General Packet Radio Service (GPRS); Service description; Stage 2 (Release 8)", 3GPP TS 23060. V8.1.0, (Jun. 2008).
Third Generation Partnership Project, "Technical Specification Group Services and System Aspects; General Packet Radio Service (GPRS); Service description; Stage 2 (Release 8)", 3GPP TS 23060. V8.5.0, (Jun. 2009).
Third Generation Partnership Project, "Technical Specification Group Services and System Aspects; General Packet Radio Service (GPRS); Service description; Stage 2 (Release 8)", 3GPP TS 23.060, V8.5.1, (Jun. 2009).
Third Generation Partnership Project, "Technical Specification Group Services and System Aspects; General Packet Radio Service (GPRS); Service description; Stage 2 (Release 9)", 3GPP TS 23.060, V9.1.0, (Jun. 2009).
Third Generation Partnership Project, "Technical Specification Group Services and System Aspects; General Packet Radio Service (GPRS); Service description; Stage 2 (Release 9)", 3GPP TS 23.060, V9.1.1, (Jun. 2009).
Third Generation Partnership Project, "Technical Specification Group Services and System Aspects; Circuit Switched Fallback in Evolved Packet System; Stage 2 (Release 8)", 3GPP TS 23.272, V8.0.0, (Jun. 2008).
Third Generation Partnership Project, "Technical Specification Group Services and System Aspects; Circuit Switched Fallback in Evolved Packet System; Stage 2 (Release 8)", 3GPP TS 23.272, V8.4.0, (Jun. 2009).
Third Generation Partnership Project, "Technical Specification Group Services and System Aspects; Circuit Switched Fallback in Evolved Packet System; Stage 2 (Release 9)", 3GPP TS 23.272, V9.0.0, (Jun. 2009).
Third Generation Partnership Project, "Technical Specification Group Core Network and Terminals; Non-Access-Stratum (NAS) Protocol For Evolved Packet System (EPS); Stage 3 (Release 8)", 3GPP TS 24.301, V0.4.0, (Jul. 2008).
Third Generation Partnership Project, "Technical Specification Group Core Network and Terminals; Non-Access-Stratum (NAS) Protocol For Evolved Packet System (EPS); Stage 3 (Release 8)", 3GPP TS 24.301, V8.2.0, (Jun. 2009).
Third Generation Partnership Project, "Technical Specification Group Core Network and Terminals; Non-Access-Stratum (NAS) Protocol For Evolved Packet System (EPS); Stage 3 (Release 8)", 3GPP TS 24.301, V8.2.1, (Jun. 2009).
Third Generation Partnership Project, "Technical Specification Group Services and System Aspects; General Packet Radio Service (GPRS) Enhancements for Evolved Universal Terrestrial Radio Access Network (E-UTRAN) Access; (Release 8)", 3GPP TS 24.401, V8.2.0, (Jun. 2008).
Third Generation Partnership Project, "Technical Specification Group Services and System Aspects; General Packet Radio Service (GPRS) Enhancements for Evolved Universal Terrestrial Radio Access Network (E-UTRAN) Access; (Release 8)", 3GPP TS 23.401, V8.6.0, (Jun. 2008).
Third Generation Partnership Project, "Technical Specification Group Services and System Aspects; General Packet Radio Service (GPRS) Enhancements for Evolved Universal Terrestrial Radio Access Network (E-UTRAN) Access; (Release 9)", 3GPP TS 23.401, V9.1.0, (Jun. 2009).
Third Generation Partnership Project, "Technical Specification Group GSM/EDGE Radio Access Network; Mobile radio interface layer 3 specification; Radio Resource Control (RRC) protocol (Release 7)", 3GPP TS 44.018 V7.13.0 (May 2008).
Third Generation Partnership Project, "Technical Specification Group GSM/EDGE Radio Access Network; Mobile radio interface layer 3 specification; Radio Resource Control (RRC) protocol (Release 7)", 3GPP TS 44.018 V7.17.0 (May 2009).
Third Generation Partnership Project, "Technical Specification Group GSM/EDGE Radio Access Network; Mobile radio interface layer 3 specification; Radio Resource Control (RRC) protocol (Release 8)", 3GPP TS 44.018 V8.3.0 (May 2008).
Third Generation Partnership Project, "Technical Specification Group GSM/EDGE Radio Access Network; Mobile radio interface layer 3 specification; Radio Resource Control (RRC) protocol (Release 8)", 3GPP TS 44.018 V8.7.0 (May 2009).
Third Generation Partnership Project, "Technical Specification Group GSM/EDGE Radio Access Network; Mobile radio interface layer 3 specification; Radio Resource Control (RRC) protocol (Release 9)", 3GPP TS 44.018 V9.1.0 (May 2009).
Third Generation Partnership Project, "Technical Specification Group Core Network; Mobile radio interface Layer 3 specification; Core network protocols; Stage 3 (Release 6)", 3GPP TS 24.008 V6.19.0 (Jun. 2008).
Third Generation Partnership Project, "Technical Specification Group Core Network; Mobile radio interface Layer 3 specification; Core network protocols; Stage 3 (Release 7)", 3GPP TS 24.008 V7.12.0 (Jun. 2008).
Third Generation Partnership Project, "Technical Specification Group Core Network; Mobile radio interface Layer 3 specification; Core network protocols; Stage 3 (Release 7)", 3GPP TS 24.008 V7.14.0 (Mar. 2009).
Third Generation Partnership Project, "Technical Specification Group Core Network; Mobile radio interface Layer 3 specification; Core network protocols; Stage 3 (Release 8)", 3GPP TS 24.008 V8.2.0 (Jun. 2008).
Third Generation Partnership Project, "Technical Specification Group Core Network; Mobile radio interface Layer 3 specification; Core network protocols; Stage 3 (Release 8)", 3GPP TS 24.008 V8.6.0 (Jun. 2009).
Third Generation Partnership Project, "Technical Specification Group Core Network and Terminals; 3GPP System Architecture Evolution; CT WG1 Aspects (Release 8)", 3GPP TR 24.801 V1.1.1 (Jul. 2008).
Third Generation Partnership Project, "Technical Specification Group Core Network and Terminals; 3GPP System Architecture Evolution; CT WG1 Aspects (Release 8)", 3GPP TR 24.801 V8.1.0 (Dec. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.6.0 (Jun. 2009).
Third Generation Partnership Project, "Technical Specification Group Radio Access Network; Radio Resource Control (RRC) protocol specification (Release 1999)," 3GPP TS 25.331 V3.21.0 (Dec. 2004).
Third Generation Partnership Project, "Technical Specification Group Radio Access Network; Radio Resource Control (RRC) Protocol Specification (Release 4)," 3GPP TS 25.331 V4.19.0 (May 2008).
Third Generation Partnership Project, "Technical Specification Group Radio Access Network; Radio Resource Control (RRC) protocol specification (Release 4)," 3GPP TS 25.331 V4.20.0 (Dec. 2008).
Third Generation Partnership Project, "Technical Specification Group Radio Access Network; Radio Resource Control (RRC) Protocol Specification (Release 5)," 3GPP TS 25.331 V5.22.1 (Aug. 2008).
Third Generation Partnership Project, "Technical Specification Group Radio Access Network; Radio Resource Control (RRC) Protocol Specification (Release 5)," 3GPP TS 25.331 V5.24.0 (Jun. 2009).
Third Generation Partnership Project, "Technical Specification Group Radio Access Network; Radio Resource Control (RRC) Protocol Specification (Release 6)," 3GPP TS 25.331 V6.18.1 (Aug. 2008). Third Generation Partnership Project, "Technical Specifica-

(56) References Cited

OTHER PUBLICATIONS tion Group Radio Access Network; Radio Resource Control (RRC) Protocol Specification (Release 6)," 3GPP TS 25.331 V6.22.0 (Jun. 2009).
Third Generation Partnership Project, "Technical Specification Group Radio Access Network; Radio Resource Control (RRC) Protocol Specification (Release 7)," 3GPP TS 25.331 V7.9.1 (Aug. 2008).
Third Generation Partnership Project, "Technical Specification Group Radio Access Network; Radio Resource Control (RRC) Protocol Specification (Release 7)," 3GPP TS 25.331 V7.13.0 (Jun. 2009).
Third Generation Partnership Project, "Technical Specification Group Radio Access Network; Radio Resource Control (RRC) Protocol Specification (Release 8)," 3GPP TS 25.331 V8.3.1 (Aug. 2008).
Third Generation Partnership Project, "Technical Specification Group Radio Access Network; Radio Resource Control (RRC); Protocol Specification (Release 8)," 3GPP TS 25.331 V8.7.0 (Jun. 2009).
Ericsson, "RAN2 functionality for CS fallback," 3GPP TSG-RAN WG2 RRC Ad Hoc, R2-082928 (Jun. 5-6, 2008).
Samsung, "Combined TA / LA Update Procedure," 3GPP TSG SA WG2 Meeting #63, TD S2-081478 (Feb. 18-22, 2008).
Third Generation Partnership Project, "Technical Specification Group Services and System Aspects; General Packet Radio Service (GPRS); Service description; Stage 2 (Release 7)", 3GPP TS 23.060, V7.7.0, (Jun. 2008).
Third Generation Partnership Project, "Technical Specification Group Services and System Aspects; General Packet Radio Service (GPRS); Service description; Stage 2 (Release 8)", 3GPP TS 23.060, V8.1.0, (Jun. 2008).
Third Generation Partnership Project, "Technical Specification Group Services and System Aspects; General Packet Radio Service (GPRS); Service description; Stage 2 (Release 8)", 3GPP TS 23.060, V8.5.0, (Jun. 2009).
Third Generation Partnership Project, "Technical Specification Group Services and System Aspects; General Packet Radio Service (GPRS) Enhancements for Evolved Universal Terrestrial Radio Access Network (E-UTRAN) Access (Release 8)", 3GPP TS 23.401, V8.2.0, (Jun. 2008).
Third Generation Partnership Project, "Technical Specification Group Services and System Aspects; General Packet Radio Service (GPRS) Enhancements for Evolved Universal Terrestrial Radio Access Network (E-UTRAN) Access (Release 8)", 3GPP TS 23.401, V8.6.0, (Jun. 2009).
Third Generation Partnership Project, "Technical Specification Group Services and System Aspects; General Packet Radio Service (GPRS) Enhancements for Evolved Universal Terrestrial Radio Access Network (E-UTRAN) Access (Release 9)", 3GPP TS 23.401, V9.1.0, (Jun. 2009).
Third Generation Partnership Project, "Technical Specification Group GSM/EDGE Radio Access Network; Mobile radio interface layer 3 specification; Radio Resource Control (RRC) protocol (Release 7)", 3GPP TS 44.018, V7.13.0, (May 2008).
Third Generation Partnership Project, "Technical Specification Group GSM/EDGE Radio Access Network; Mobile radio interface layer 3 specification; Radio Resource Control (RRC) protocol (Release 7)", 3GPP TS 44.018, V7.17.0, (May 2009).
Third Generation Partnership Project, "Technical Specification Group GSM/EDGE Radio Access Network; Mobile radio interface layer 3 specification; Radio Resource Control (RRC) protocol (Release 8)", 3GPP TS 44.018, V8.3.0, (May 2008).
Third Generation Partnership Project, "Technical Specification Group GSM/EDGE Radio Access Network; Mobile radio interface layer 3 specification; Radio Resource Control (RRC) protocol (Release 8)", 3GPP TS 44.018, V8.7.0, (May 2009).
Third Generation Partnership Project, "Technical Specification Group GSM/EDGE Radio Access Network; Mobile radio interface layer 3 specification; Radio Resource Control (RRC) protocol (Release 9)", 3GPP TS 44.018, V9.1.0, (May 2009).
Third Generation Partnership Project, "Technical Specification Group Core Network; Mobile radio interface Layer 3 specification; Core network protocols; Stage 3 (Release 6)", 3GPP TS 24.008, V6.19.0, (Jun. 2008).
Third Generation Partnership Project, "Technical Specification Group Core Network; Mobile radio interface Layer 3 specification; Core network protocols; Stage 3 (Release 7)", 3GPP TS 24.008, V7.12.0, (Jun. 2008).
Third Generation Partnership Project, "Technical Specification Group Core Network; Mobile radio interface Layer 3 specification; Core network protocols; Stage 3 (Release 7)", 3GPP TS 24.008, V7.14.0, (Mar. 2008).
Third Generation Partnership Project, "Technical Specification Group Core Network; Mobile radio interface Layer 3 specification; Core network protocols; Stage 3 (Release 8)", 3GPP TS 24.008, V8.2.0, (Jun. 2008).
Third Generation Partnership Project, "Technical Specification Group Core Network; Mobile radio interface Layer 3 specification; Core network protocols; Stage 3 (Release 8)", 3GPP TS 24.008, V8.6.0, (Jun. 2009).
Third Generation Partnership Project, "Technical Specification Group Core Network and Terminals; 3GPP System Architecture Evolution; CT WG1 Aspects (Release 8)", 3GPP TR 24.801, V1.1.1, (Jul. 2008).
Third Generation Partnership Project, "Technical Specification Group Core Network and Terminals; 3GPP System Architecture Evolution; CT WG1 Aspects (Release 8)", 3GPP TR 24.801, V8.1.0, (Dec. 2008).
Third Generation Partnership Project, "Technical Specification Group Radio Access Network; Evolved Universal Terrestrial Radio Access (E-UTRA) Radio Resource Control (RRC); Protocol specification (Release 8)", 3GPP TS 36.331, V8.2.0, (May 2008).
Third Generation Partnership Project, "Technical Specification Group Radio Access Network; Evolved Universal Terrestrial Radio Access (E-UTRA) Radio Resource Control (RRC); Protocol specification (Release 8)", 3GPP TS 36.331, V8.6.0, (Jun. 2009).

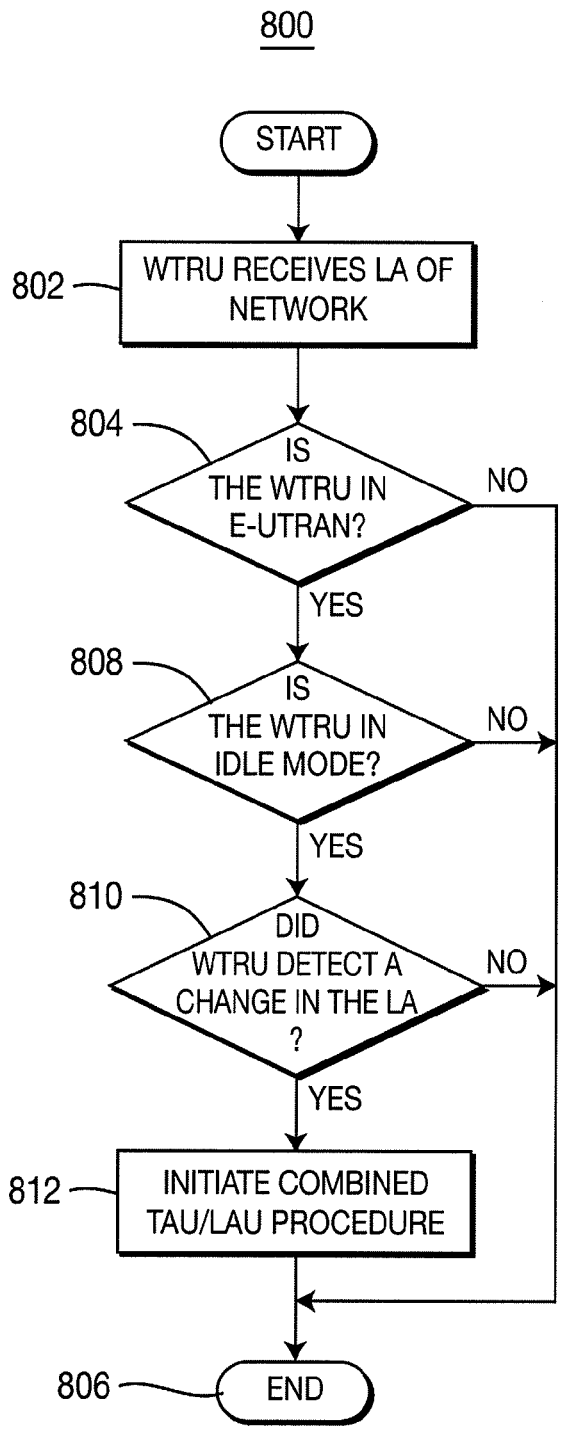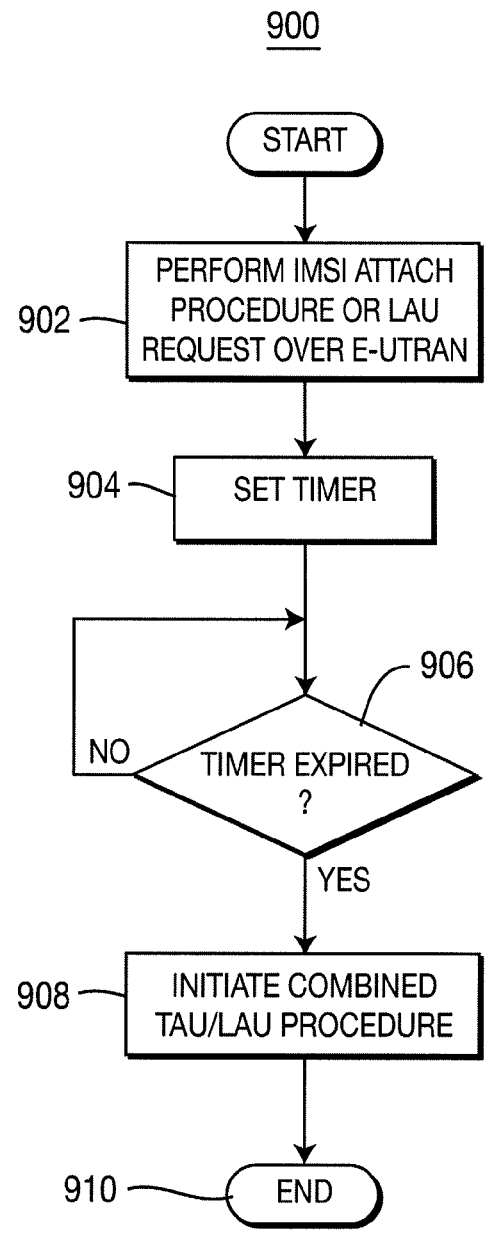
FIG. 8
FIG. 9

US 8,774,173 B2

PROVIDING CIRCUIT SWITCHED OPERATION IN AN ENHANCED UNIVERSAL TERRESTRIAL RADIO ACCESS NETWORK

CROSS REFERENCE TO RELATED APPLICATIONS

This application is a continuation of U.S. patent application Ser. No. 12/506,493, filed Jul. 21, 2009, which issue as U.S. Pat. No. 8,243,725 on Aug. 14, 2012, which claims the benefit of U.S. Provisional Application No. 61/088,397, filed Aug. 13, 2008, the contents of which are hereby incorporated by reference herein.

FIELD OF INVENTION

This application is related to wireless communications.

BACKGROUND

A goal of the Third (3$^{rd}$) Generation Partnership Project (3GPP) Long Term Evolution (LTE) program is to develop new technology, new architecture, and new methods in new LTE settings and configurations. These features are being developed to provide improved spectral efficiency, reduced latency, and better utilization of the radio resources. These features are intended to provide faster user experiences, richer applications, and improved services, with less cost.

LTE is a Packet Switched (PS)-only radio technology. It is desirable to support backwards mobility with legacy Global System for Mobile Communications (GSM). For inter-working with legacy Circuit Switched (CS) networks, such as GSM, it was expected that IP Multimedia Core Network Subsystem (IMS) networks would be deployed. Specifically, Voice Call Continuity (VCC) was expected to be the technique used for handing over voice calls from LTE PS networks, using Voice over Internet Protocol (VoIP) techniques, to legacy CS networks. It would be desirable to de-couple IMS deployments from LTE deployments. In other words, it would be desirable to initially use the currently deployed CS infrastructure for voice calls, while deploying LTE for high-speed PS services only. For this reason, it would be desirable for LTE to allow a multi-mode wireless transmit/receive unit (WTRU), such as with LTE and GSM and/or Wideband Code Division Multiple Access (WCDMA), use the LTE network for high-speed PS data traffic while reverting to legacy CS network for voice traffic, without necessarily using any IMS features such as VCC.

When a WTRU attaches to the Evolved Packet System (EPS) over the E-UTRAN network, the Non Access Stratum (NAS) layer Attach message may include a CS fallback indicator to indicate to the network the need to attach the WTRU in the CS domain as well. The Mobility Management Entity (MME) may then perform the attachment to the CS domain on behalf of the WTRU, before indicating that the process completed via the Attach Accept message, as shown in FIG. 1. The Attach procedure for the CS fallback in EPS may be realized based on a combined General Packet Radio Service (GPRS)/International Mobile Subscriber Identifier (IMSI) Attach procedure as specified in the 3GPP standard TS 23.060.

FIG. 1 is a flow diagram of a method 100 for performing an Attach procedure. In the method 100, messages are exchanged between a WTRU 102, an MME 104, a mobile switching center/visitor location register (MSC/VLR) 106, and a home subscriber server (HSS) 108. The WTRU 102 initiates the Attach procedure by transmitting an Attach Request message, including parameters as specified in 3GPP standard TS 23.401 and a CS fallback indicator, to the MME 104 (step 110). The CS fallback indicator indicates that the WTRU 102 is capable of using CS fallback and configured to use CS fallback.

The EPS Attach procedure is performed as specified in 3GPP standard TS 23.401 (step 112). The VLR 106 is updated according to the combined GPRS/IMSI Attach procedure in 3GPP standard TS 23.060 if the Attach Request message includes a Combined Update indicator (step 114). The VLR number is derived from the Tracking Area Identity (TAT). The MME 104 starts the location update procedure towards the new MSC/VLR upon receiving the first Insert Subscriber Data message from the HSS 108. This operation marks the WTRU 102 as EPS-attached in the VLR 106.

The MME 104 sends a Location Update Request message, such as a new Location Area Identity (LAI), IMSI, MME address, or Location Update Type, to the VLR 106 (step 116). A new LAI is determined in the MME 104 based on a mapping from the Tracking Area (TA). A mapped LAI may be to either a GSM EDGE Radio Access Network (GERAN) or a UMTS Terrestrial Radio Access Network (UTRAN).

The VLR 106 creates an association with the MME 104 by storing the MME address (step 118). The VLR 106 performs a location update procedure in the CS domain (step 120). The VLR 106 responds to the MME 104 with a Location Update Accept message, such as a VLR Temporary Mobile Subscriber Identity (TMSI) (step 122). The MME 104 sends an Attach Accept message, including parameters as specified in 3GPP standard TS 23.401, a Location Area Identity (LAI), and a VLR TMSI (if allocated), to the WTRU (step 124). The existence of a LAI (and a VLR TMSI, if allocated) indicates a successful attachment to the CS domain.

FIG. 2 is a flow diagram of a method 200 for a WTRU terminating a call while in Idle mode. In the method 200, messages are exchanged between a WTRU 202, an eNB 204, a MME 206, a radio network controller (RNC) or base station controller (BSC) 208, a MSC/VLR 210, a HSS 212, and a gateway mobile switching center (GMSC) 214.

The method 200 begins with the GMSC 214 receives an initial address message (IAM; step 220). The GMSC 214 retrieves the routing information of the terminating WTRU by using the Send Routing Info (SRI) procedures (step 222). The GMSC 214 sends the IAM to the MSC 210 on the terminating side (step 224).

The MME 206 receives a paging (IMSI, VLR TMSI, or Location Information) message from the MSC 210 over a SGs interface (step 226). The TMSI (or IMSI) received from the MSC 210 is used by the MME 206 to find the S-TMSI, which is used as the paging address on the radio interface. If the location information is reliably known by the MME 206 (i.e., the MME stores the list of TAs), the MME 206 pages the WTRU 202 in all the TAs. If the MME 206 does not have a stored TA list for the WTRU 202, the MME 206 should use the location information received from the MSC to page the WTRU. If pre-paging is deployed, this procedure takes place before step 224, immediately after the MSC 210 receives the MAP_PRN message from the HSS 212.

The MME 206 sends a paging message to each eNB 204 (step 228). The paging message includes a suitable WTRU identity (i.e., S-TMSI or IMSI) and a core network (CN) domain indicator that indicates which domain (CS or PS) initiated the paging message. In this case, the domain indicator is set to "CS" by the MME 206. The eNB 204 pages the WTRU 202 (step 230), and the paging message contains a suitable WTRU identity (i.e., S-TMSI or IMSI) and a CN domain indicator.

The WTRU 202 establishes an RRC connection and sends an Extended Service Request (CS fallback indicator) to the MME 206 (step 232). The WTRU 202 indicates its S-TMSI in the RRC signaling. The Extended Service Request message is encapsulated in RRC and S1 AP messages. The CS fallback indicator indicates to the MME 206 that CS fallback for the WTRU 206 is required. The MME 206 sends S1 AP: Initial WTRU Context Setup (including WTRU capabilities, CS fallback indicator, and other parameters) to indicate the eNB 204 to move the WTRU 202 to UTRAN/GERAN (step 234).

For the next action, there are two options, the choice depending on whether the target RAT has PS handover (HO) capability or not. If the target RAT has PS HO capability, then upon receipt of the Initial WTRU Context Setup message with a CS fallback indicator, the eNB 204 may optionally solicit measurement reports from the WTRU 202 to determine the target cell to which PS handover will be performed (step 236). A PS handover is then performed and as part of the PS handover, the WTRU 202 receives a HO from E-UTRAN Command that may contain a CS fallback indicator, which indicates to the WTRU 202 that the handover was triggered due to a CS fallback request. If the HO from E-UTRAN Command contains a CS fallback indicator and the WTRU 202 fails to establish a connection to the target RAT, then the WTRU 202 considers that the CS fallback has failed.

If the target RAT has no PS HO capability, then upon receipt of the Initial WTRU Context Setup message with a CS fallback indicator, the eNB 204 may optionally solicit measurement reports from the WTRU 202 to determine the target cell to redirect the WTRU 202 to (step 236). After that, the eNB 204 releases the RRC Connection with redirection information to change to a CS-capable RAT (including RAT, frequency, and cell information). As an option, the inter-RAT system information might be provided by the eNB 204 using the Network Assisted Cell Change (NACC) procedure for GERAN. In this case, the WTRU 202 receives in inter-RAT cell change order that may contain a CS fallback indicator, which indicates to the WTRU 202 that the cell change order was triggered due to a CS fallback request. If the inter-RAT cell change order contains a CS fallback indicator and the WTRU 202 fails to establish a connection to the target RAT, then the WTRU 202 considers that the CS fallback has failed.

If the WTRU 202 obtains the LA/RA information of the new UTRAN/GERAN cell (e.g., based on the system information or redirection information) and the LA/RA of the new cell is different from the one stored in the WTRU 202, it performs a LA Update or a Combined RA/LA update procedure if the target system operates in Network Mode of Operation (NMO) I (step 238). The WTRU 202 responds with a page response message to the MSC 210 as follows.

If the target RAT is UTRAN or GERAN Iu mode, the WTRU 202 establishes an RRC connection and responds to the paging message in an RRC Initial Direct Transfer message. The CN domain indicator is set to "CS" in the Initial Direct Transfer message. When received at the RNC 208, the Paging Response message is sent in an RANAP Initial WTRU message to the MSC 210 (step 242).

If the target RAT is GERAN A/Gb mode, the WTRU 202 establishes an RR connection by using the procedures specified in 3GPP TS 44.018 (i.e., the WTRU 202 requests and is assigned a dedicated channel, where it sends a Set Asynchronous Balanced Mode (SABM) containing a layer 3 Service Request message=PAGING RESPONSE to the BSS and the BSS responds by sending a UA). After establishing the main signaling link as described in 3GPP TS 44.018, the WTRU 202 enters either Dual Transfer Mode or Dedicated Mode and the CS call establishment procedure completes. When received at the BSC 208, the Paging Response message is sent in a BSSAP COMPLETE LAYER 3 INFORMATION message to the MSC. The BSS should be prepared to receive a PAGING RESPONSE even when a corresponding PAGING REQUEST has not been sent by this BSS. Also, the MSC 210 should be prepared to receive a paging response after a relatively long time from when the CS paging message was sent (step 226).

In case the MSC serving the 2G/3G cell is the same as the MSC that served the WTRU 202 while camped on LTE, it stops the paging response timer and establishes the CS connection (step 244).

If the MSC that receives the paging response is different from the MSC that sent the paging request and if the LA Update or Combined RA/LA Update was not performed, the MSC rejects the page response by releasing the A/Iu-cs connection (step 246). The RNC/BSC 208 in turn releases the RRC/RR connection (step 248). The RRC/RR release triggers the WTRU 202 to perform a LA Update (step 250) as follows. If the target system operates in Network Mode of Operation (NMO) I, then the WTRU 202 performs a combined RA/LA Update. When the target system operates in NMO I, if the WTRU 202 is still in UTRAN/GERAN after the CS voice call is terminated and if a combined RA/LA Update has not already been performed, the WTRU 202 performs a combined RA/LA Update procedure. This procedure is used to create a Gs association between the MSC/VLR 210 and the SGSN and to release the SGs association.

If the target system operates in NMO II or III, then the WTRU 202 performs a LA Update towards the MSC 210. The LA Update triggers the Roaming Retry for CS fallback procedure. When the target system operates in NMO II or III, if the WTRU 202 is still in UTRAN/GERAN after the CS voice call is terminated and if a LA Update has not already been performed, the WTRU 202 performs a LA Update procedure. This procedure is used to release the SGs association between the MSC/VLR 210 and the MME 206.

It is noted that if the WTRU is in Idle mode, then paging may be initiated, because the network is not aware of the location and attachment status of the WTRU. If the WTRU is in Connected mode, meaning that the WTRU is attached to the network, paging the WTRU is not needed and the network may easily reach the WTRU via a dedicated message. One example of a dedicated message is a "CS service notification" message.

FIG. 3 is a flow diagram of a method 300 for the preparation phase of a mobile originated (MO) call in active mode. In the method 300, messages are exchanged between a WTRU 302, an eNB 304, a BSS 306, an MME 308, an MSC 310, a SGSN 312, and a serving GW 314. The WTRU 302 sends a CS Call Request message to the eNB 304 (step 320). The eNB 304 may optionally request a measurement report from the WTRU 302 to determine the target GERAN/UTRAN cell to which PS handover will be performed (step 322).

When the WTRU 302 is moving, it may be necessary to handover the WTRU to a different eNB and/or BSS to maintain the connection between the WTRU and the network (i.e., perform a relocation process). The eNB 304 sends a Relocation Required message to the MME 308 (step 324). The MME 308 forwards a Relocation Request message to the SGSN 312 (step 326). The SGSN 312 sends a PS Handover Request message to the BSS 306 (step 328). The SGSN 312 reserves radio resources in a target BSS (step 330) and the target BSS creates a Target BSS to Source BSS Transparent Container (step 332). The BSS 306 sends a PS Handover Request Acknowledge message to the SGSN 312 (step 334). The SGSN 312 forwards a Relocation Response message to the MME 308 (step 336). After this step is completed, the WTRU 302 has been handed over to the target BSS.

FIG. 4 is a flow diagram of a method 400 for the execution phase of a MO call in active mode. In the method 400, messages are exchanged between a WTRU 402, an eNB 404, a BSS 406, an MME 408, an MSC 410, a SGSN 412, and a serving GW 414. Uplink and downlink payload PDUs are exchanged between the WTRU 402 and the eNB 404, utilizing the serving GW 414 as needed (step 420). The MME 408 sends a Relocation Command to the eNB 404 (step 422), which triggers the eNB 404 to send a Handover from E-UTRAN Command to the WTRU 402 (step 424).

The WTRU 402 and the eNB 404 perform a GERAN A/Gb access procedure (step 426) and the WTRU 402 sends an XID Response message to the BSS 406 (step 428). The BSS 406 sends a PS Handover Complete message to the SGSN 412 (step 430) and forwards the XID Response message to the SGSN 412 (step 432). Also at this time, it is possible for the WTRU 402 to send uplink packet data to the eNB 404 (step 434).

If the target RAT is GERAN, the WTRU 402 sends a SABM message with a Connection Management (CM) Service Request to the BSS 406 (step 436). The BSS 406 forwards complete Layer 3 information along with the CM Service Request to the MSC 410, which indicates that CS resources have been allocated in the GERAN cell (step 438). The BSS 406 responds to the WTRU 402 by sending a UA with the CM Service Request, which positively acknowledges the SABM message (step 440). The WTRU 402 then initiates a CS call establishment procedure (step 442).

Part of the processing of the Handover from E-UTRAN Command (step 424) includes the SGSN 412 receiving a Handover Complete message. Upon receiving the Handover Complete message, the SGSN 412 sends a Forward Relocation Complete message to the MME 408 to indicate completion of the PS handover procedure (step 444). The MME 408 responds to the SGSN 412 by sending a Forward Relocation Complete Acknowledge message to the SGSN 412 (step 446).

The SGSN 412 sends an Update PDP Context Request message to the serving GW, including a new SGSN address, a tunnel endpoint identifier (TEID), and a negotiated quality of service (QoS) (step 448) and optionally sends IP packets to the serving GW 414 (step 450). The serving GW 414 updates the PDP context fields and sends an Update PDP Context Response message (including the TEID) to the SGSN 412 (step 452). At this point, the serving GW 414 sends new incoming downlink IP packets to the SGSN 412 instead of the source eNB (step 454). The downlink IP packets are then forwarded to the BSS 406 (step 456) and ultimately to the WTRU 402 (step 458).

The WTRU 402 and the SGSN 412 perform an XID negotiation procedure for LLC ADM (step 460). The WTRU 402 and the SGSN 412 may also perform an XID negotiation procedure for LLC ABM (step 462). It is noted that one or both of the XID negotiation procedures (for ADM and ABM) may be performed, depending on the LLC layer parameters to be negotiated. The WTRU 402 triggers a routing area update procedure when it is possible to send uplink data packets (step 464).

Even with the foregoing procedures, there are two problems that need to be addressed: a combined location area update/tracking area update and the identity of the WTRU that is used for paging.

1. Combined Location Area Update/Tracking Area Update

One problem relates to the combined Location Area Update (LAU)/Tracking Area Update (TAU) procedure necessary to remain attached to the CS domain while in the E-UTRAN. In legacy GPRS, a routing area (RA) was a subset of a location area (LA). The system information would broadcast both the location area identity (LAI) and the routing area identity (RAI). A change in LA implied a change in RA, but not vice versa. In LTE System Information, there is no provision to broadcast the LA code of the surrounding legacy GSM/UMTS CS network. In addition, there is not supposed to be a pre-defined relationship between TAs and LAs. Therefore, this problem may be stated: how does the WTRU determine that a combined TAU/LAU procedure needs to be triggered?

2. WTRU Identity for Paging

A second problem relates to the WTRU identity for paging. In LTE, the WTRU identity for paging is the S Temporary Mobile Subscriber Identity (S-TMSI). But the WTRU is not supposed to respond to paging messages via the IMSI in LTE. In legacy GSM, the WTRU may be paged using either the TMSI or the IMSI.

In case the WTRU performed a combined EPS/IMSI Attach or a Combined TAU/LAU procedure, the MSC/VLR would either assign a TMSI to the WTRU or use the WTRU's IMSI for paging. A TMSI is unique only within the LA where it was assigned. Because there is no relationship between LAs and TAs, a WTRU may, in Idle Mode, cross LAs where the previously assigned TMSI may be invalid. FIG. 5 shows a conceivable scenario where the WTRU, while being in the same TA (TA1), crosses between two different LAs, such as LA1 and LA2, without performing a TA update procedure toward the MME. The problem in this situation is how to properly page the WTRU.

During the Attach procedure for connecting to LTE services (as shown in FIG. 1), the network must allocate an ID number to the WTRU (a Global Unique Temporary Identifier (GUTI) which includes the S-TMSI). All paging messages to the WTRU use the S-TMSI as the identifier for the WTRU. Under existing procedures, if the network pages the WTRU using the IMSI, the WTRU is supposed to detach from the network and then reattach to the network, to create the appropriate parameters in the network's database so that the WTRU may be paged using the IMSI. As one example, in GSM, the WTRU always has an IMSI and may also have a TMSI, if assigned by the network. But, the VLR does not have to allocate a TMSI to the WTRU. In LTE, the MME must allocate a GUTI, which includes the S-TMSI. If the VLR does not allocate a TMSI to the WTRU, and sends back the WTRU's IMSI in the Attach Accept message, then the WTRU must delete any TMSI that it had stored. As a result, the WTRU may only be paged by the IMSI. But if the WTRU may only be paged by the IMSI in the CS domain, there is a problem, because in LTE, the WTRU cannot be paged by the IMSI, and has to be paged by the S-TMSI.

SUMMARY

A WTRU may be paged by using the assigned IMSI. A bit may be added to existing messaging to indicate that the CN domain is CS, so that the WTRU knows it is receiving a CS page using the IMSI. When the WTRU falls back (i.e., leaves E-UTRAN) to GERAN or UTRAN, it must use the IMSI in the paging response message to the MSC/VLR. In addition, the WTRU indicates a combined LAU/TAU when it is registered in both the PS and the CS domains and the mobility management procedure for a tracking area update has been triggered.

BRIEF DESCRIPTION OF THE DRAWINGS

A more detailed understanding may be had from the following description, given by way of example in conjunction with the accompanying drawings, wherein:

FIG. 8 is a flowchart of a method for triggering a combined TAU/LAU procedure;

FIG. 9 is a flowchart of another method for triggering a combined TAU/LAU procedure;

DETAILED DESCRIPTION

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

A person having ordinary skill in the art should understand that the method and apparatus provided herein are applicable to any access technology which uses circuit switched or packet switched data, such as 3GPP LTE, WCDMA, GSM, GPRS, Enhanced Data for GSM Evolution (EDGE), Code Division Multiple Access (CDMA) 2000 (and related technologies), and the IEEE 802 family of technologies, for example 802.11, 802.16, and WiMAX.

Figure 1:
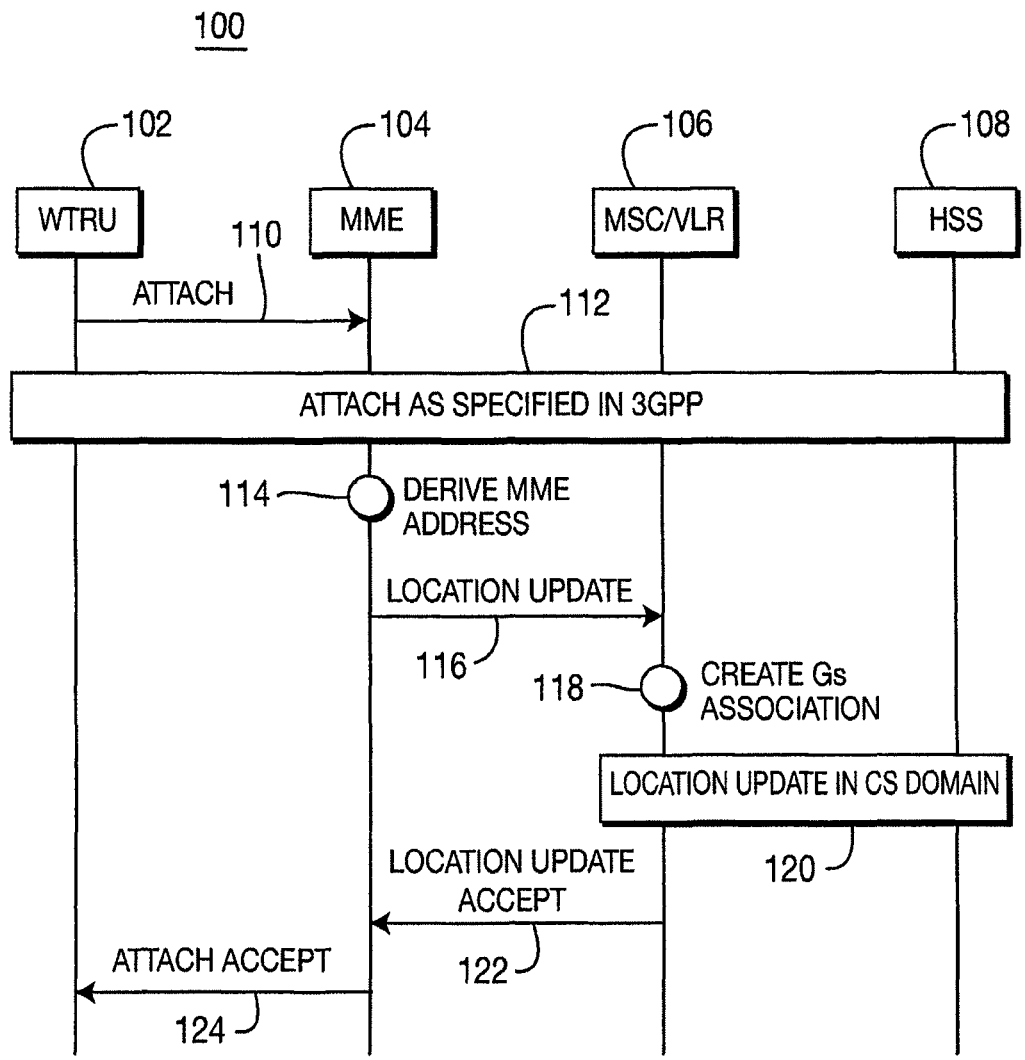
FIG. 1 is a signal diagram of an attach procedure for CS fallback.
Figure 2:
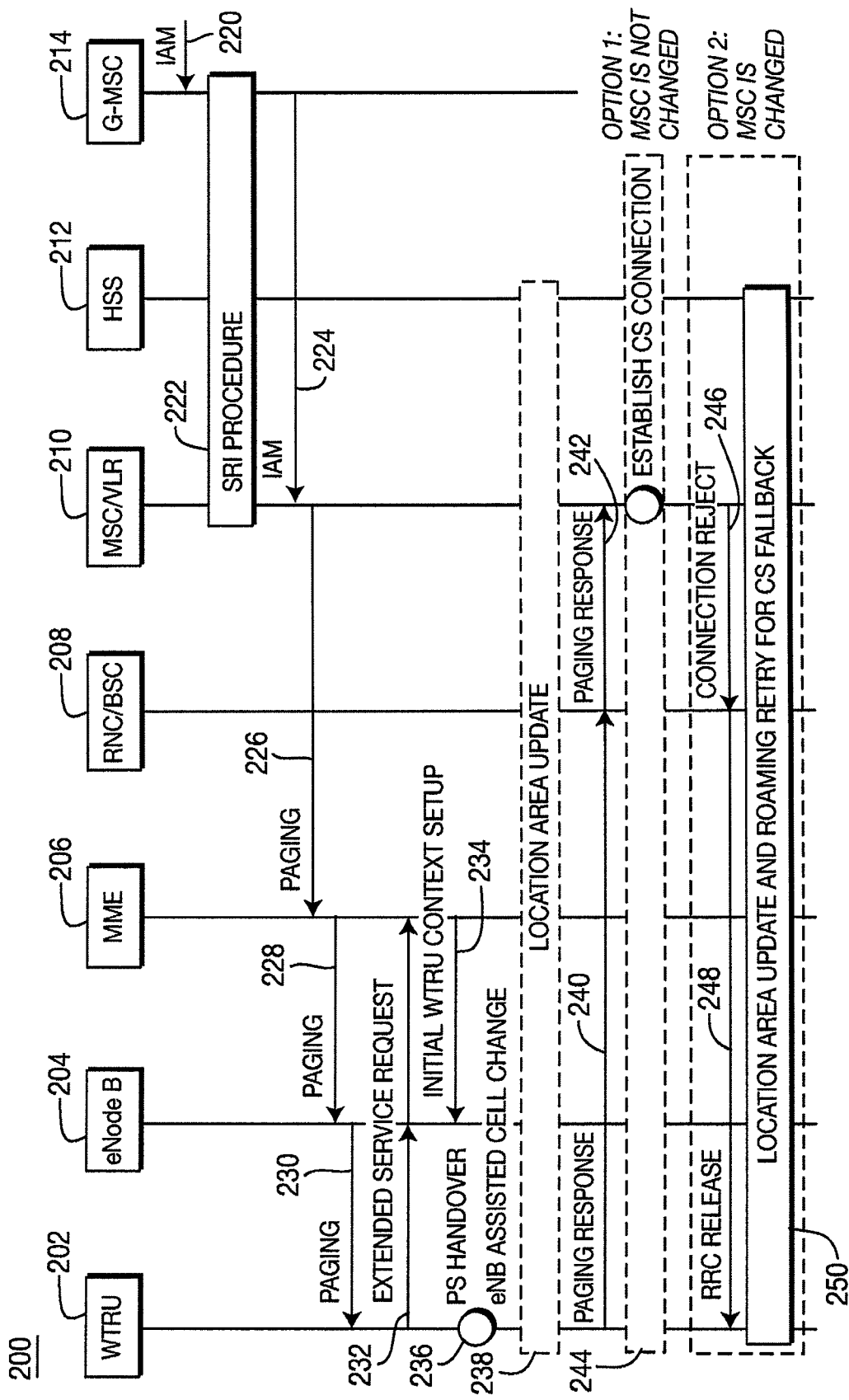
FIG. 2 is a signal diagram of a method for a WTRU terminating a call while in Idle mode.
Figure 3:
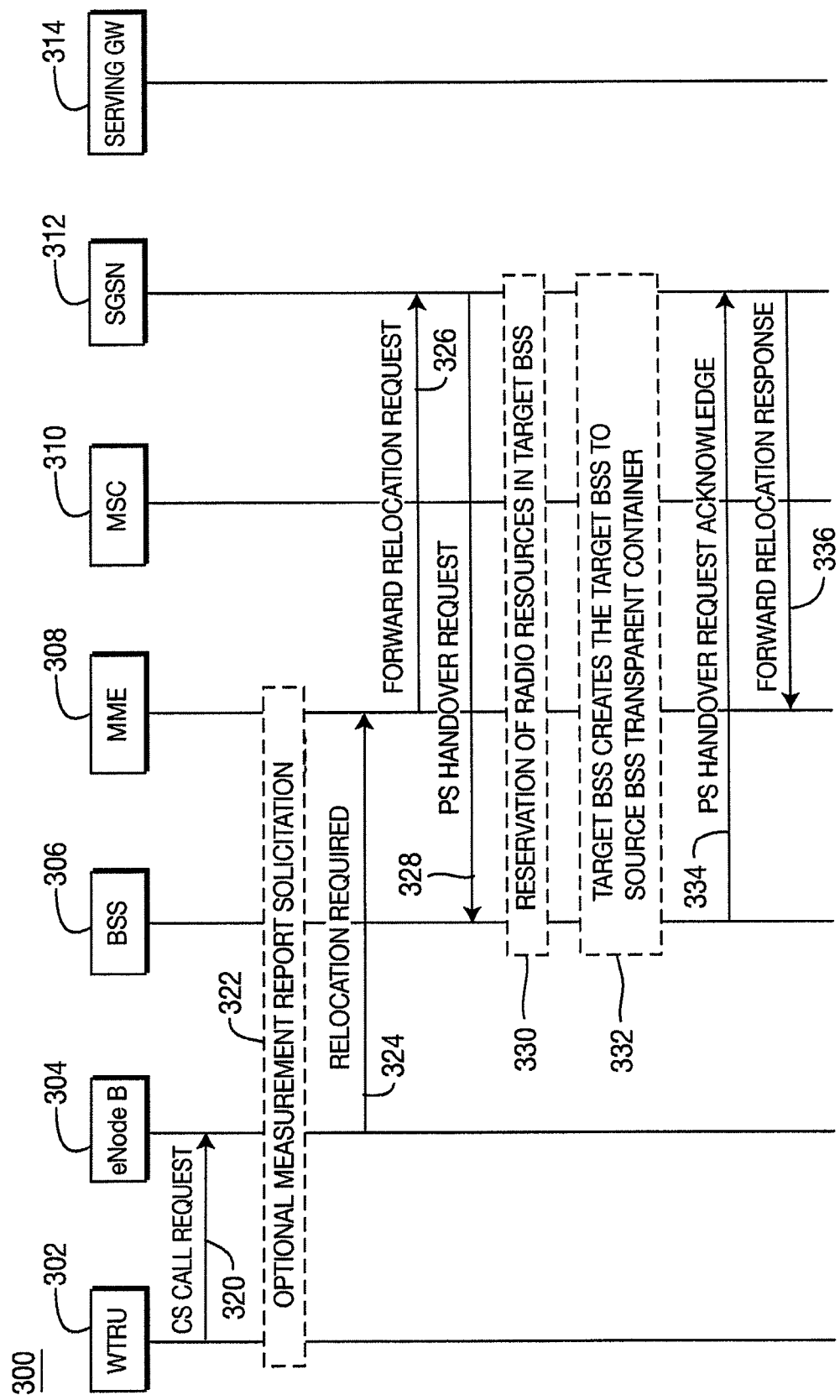
FIG. 3 is a signal diagram of the preparation phase of a MO call in active mode.
Figure 4:
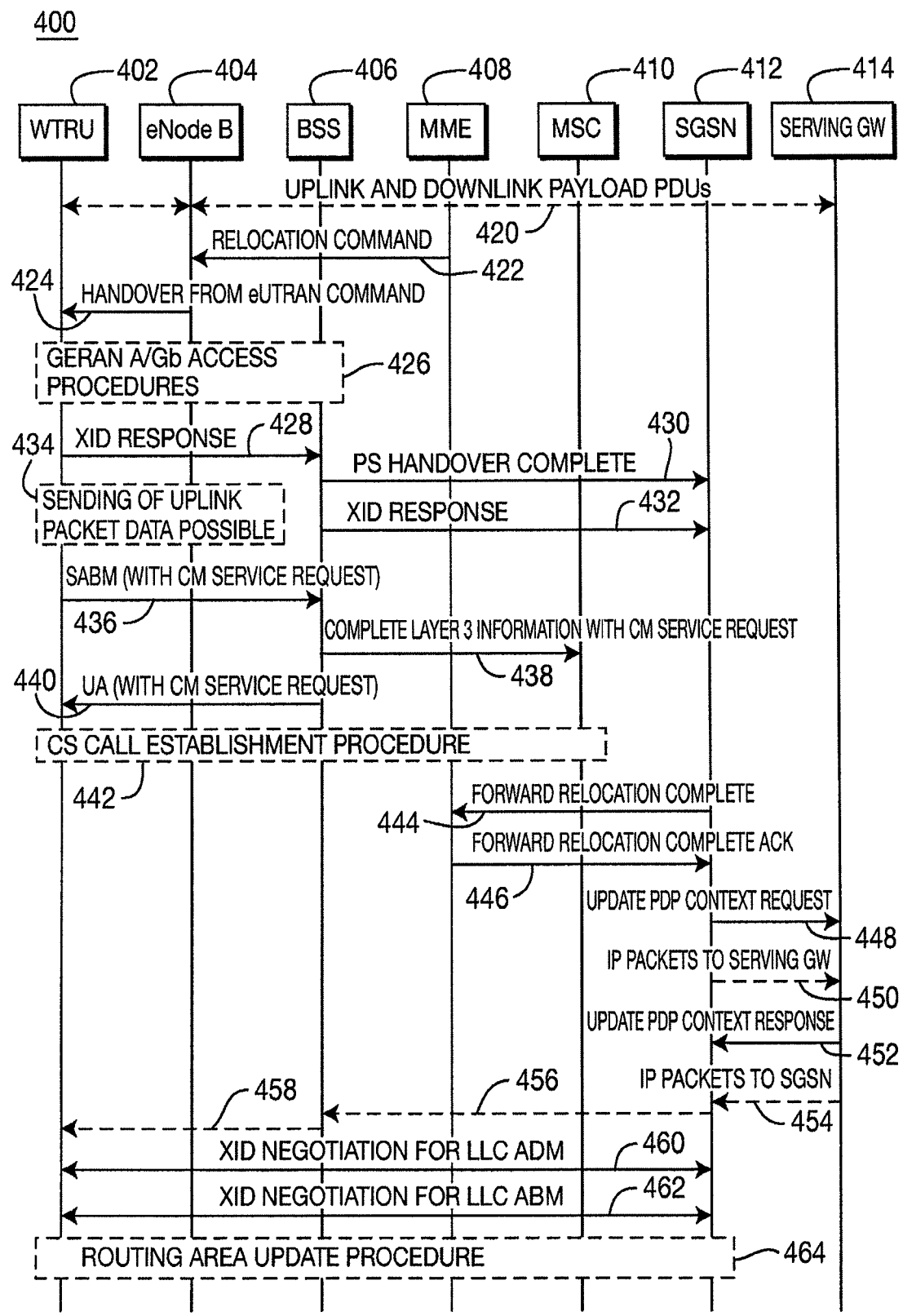
FIG. 4 is a signal diagram of the execution phase of a MO call in active mode.
Figure 5:
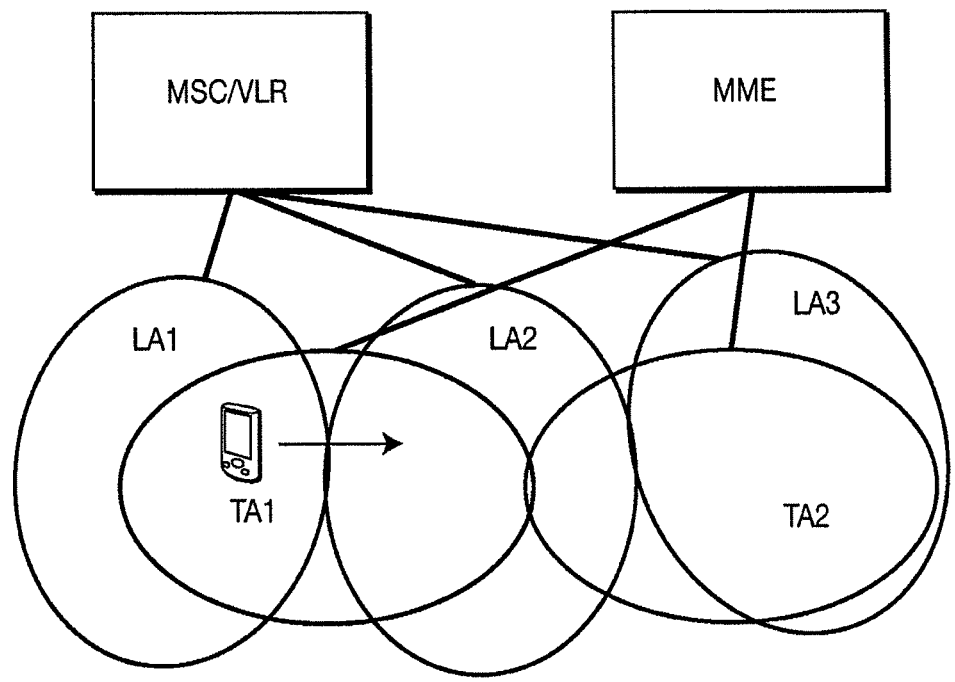
FIG. 5 is a diagram of an example relationship between location areas and tracking areas.
Figure 6:
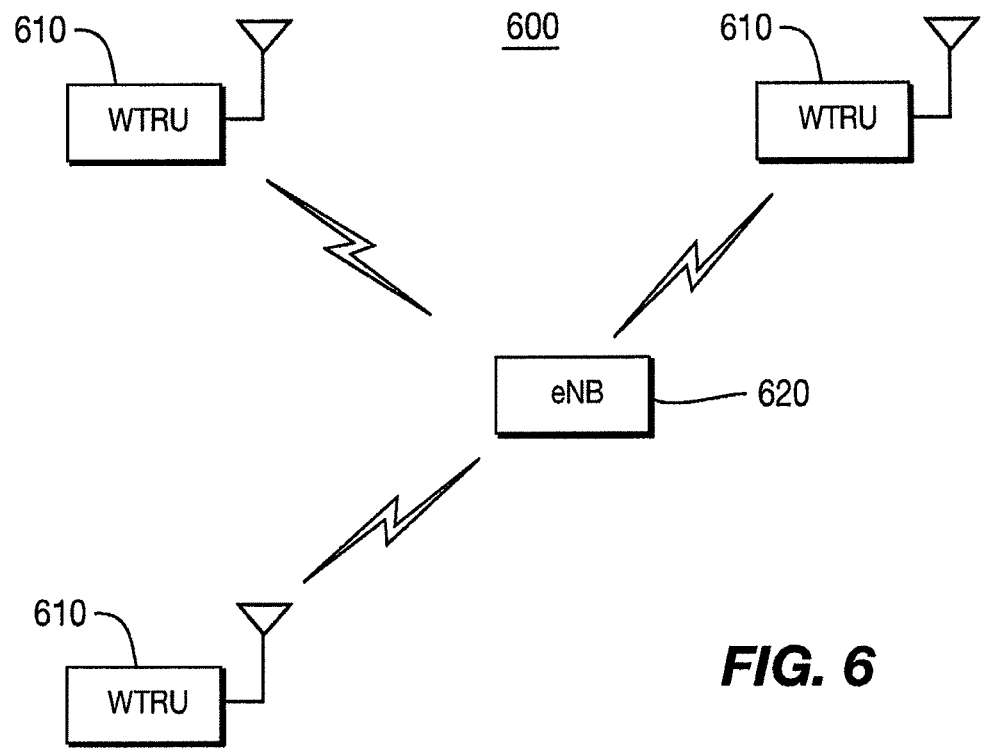
FIG. 6 shows an example wireless communication system including a plurality of wireless transmit/receive units (WTRUs) and an evolved Node B (eNB)

FIG. 6 shows an example wireless communication system 600 including a plurality of WTRUs 610 and an eNB 620. As shown in FIG. 6, the WTRUs 610 are in communication with the eNB 620. It should be noted that, although an example configuration of WTRUs 610 and an eNB 620 is depicted in FIG. 6, any combination of wireless and wired devices may be included in the wireless communication system 600.

Figure 7:
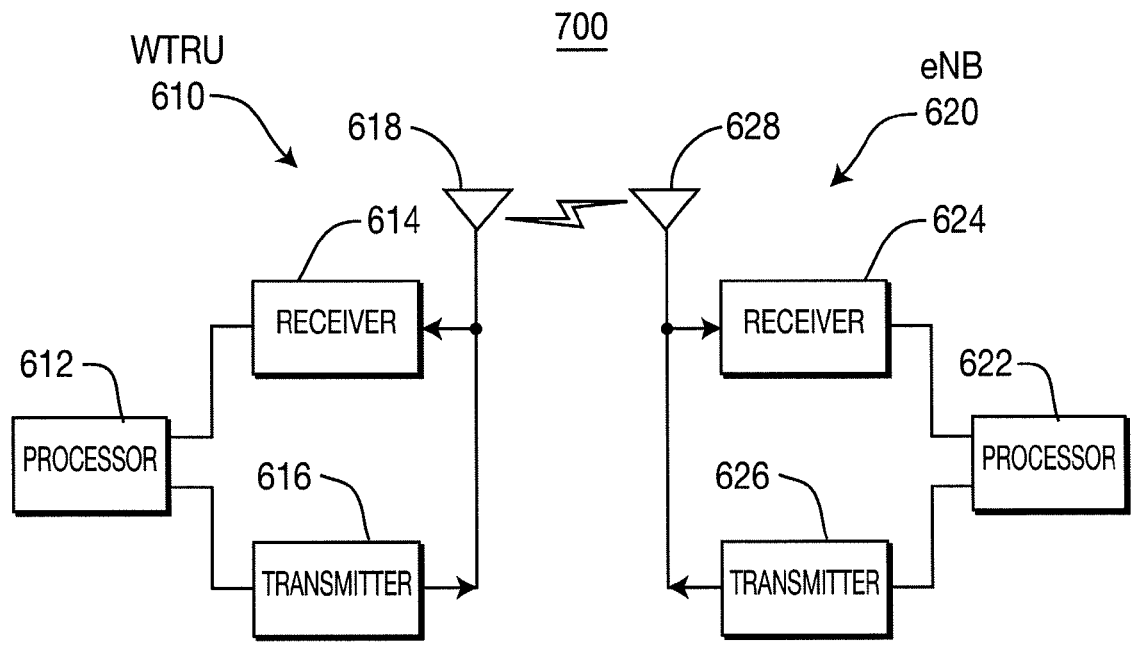
FIG. 7 is an example functional block diagram of a WTRU and the eNB of FIG. 6.

FIG. 7 is an example functional block diagram 700 of a WTRU 610 and the eNB 620 of the wireless communication system 600 of FIG. 6. As shown in FIG. 7, the WTRU 610 is in communication with the eNB 620.

In addition to the components that may be found in a typical WTRU, the WTRU 610 includes a processor 612, a receiver 614, a transmitter 616, and an antenna 618. The receiver 614 and the transmitter 616 are in communication with the processor 612. The antenna 618 is in communication with both the receiver 614 and the transmitter 616 to facilitate the transmission and reception of wireless data. The processor 612 is configured to perform a method of maintaining circuit switched continuity in an E-UTRAN.

In addition to the components that may be found in a typical Node B, the Node B 620 includes a processor 622, a receiver 624, a transmitter 626, and an antenna 628. The receiver 624 and the transmitter 626 are in communication with the processor 622. The antenna 628 is in communication with both the receiver 624 and the transmitter 626 to facilitate the transmission and reception of wireless data. The processor 622 is configured to perform a method of maintaining circuit switched continuity in an E-UTRAN.

Triggers for Performing a Combined TAU/LAU

The following triggers for performing a combined tracking area update (TAU)/location area update (LAU) may be used individually or in any combination.

System Information Indication

The E-UTRAN system information may carry an indication of the LA of the surrounding CS network, such as GSM or UMTS. This information may, for example, be carried on E-UTRAN System Information Blocks, such as SIB1. The information may indicate whether the LA is valid for a GERAN network or a UTRAN network. This information may indicate to the WTRU whether a combined TAU/LAU procedure is required in this area.

A WTRU that is currently in the E-UTRAN and in IDLE mode may initiate a combined TAU/LAU procedure when it detects a change in the LA broadcast by the System Information Block (SIB) in the E-UTRAN. FIG. 8 is a flowchart of a method 800 for triggering a combined TAU/LAU procedure. The method 800 begins with the WTRU receiving the LA of the surrounding CS network (step 802). A determination is made whether the WTRU is currently in the E-UTRAN (step 804). If the WTRU is not currently in the E-UTRAN, then the method terminates (step 806). If the WTRU is currently in the E-UTRAN, a determination is made whether the WTRU is in Idle mode (step 808). If the WTRU is not in Idle mode, then the method terminates (step 806). If the WTRU is in Idle mode, then a determination is made whether the WTRU has detected a change in the LA (step 810). If the WTRU has not detected a change in the LA, then the method terminates (step 806). If the WTRU has detected a change in the LA, then the WTRU initiates a combined TAU/LAU procedure (step 812) and the method terminates (step 806).

Timer

The MSC/VLR may assign a timer to the WTRU when it performs an IMSI Attach procedure or a LAU Request procedure over the E-UTRAN. The timer may continue running in the NAS, even if the Evolved Packet System Mobility Management (EMM) sub-layer is in EMM-Connected mode or in EMM-Idle mode, as long as the WTRU is registered in the EPS domain, the CS domain, or both. When the timer expires, the WTRU may initiate a combined TAU/LAU procedure.

FIG. 9 is a flowchart of method 900 for triggering a combined TAU/LAU procedure. The method 900 begins with the WTRU performing an IMSI Attach procedure or a LAU Request procedure over the E-UTRAN (step 902). After one of these procedures is performed, a timer is set by the MSC/

VLR (step 904). Once the timer expires (step 906), the WTRU initiates a combined TAU/LAU procedure (step 908) and the method terminates (step 910).

Subscriber Identity Module (SIM) Card

The MSC/VLR may inform the WTRU about a new LAI to be stored on the WTRU's SIM card via the MME without the WTRU initiating a LAU request. As an example, in connected mode, if the MME determines that the WTRU is in an area belonging to a different LAI than the last registered LA, it may initiate the LAU on behalf of the WTRU. When doing so, the MME sends the new LAI and IMSI to the WTRU. The WTRU identity may be the TMSI, in case the MME creates and holds an association between the WTRU IMSI and the TMSI. The network may then configure the WTRU with a new LAI (and optionally a new TMSI) in any NAS message.

Figure 10:
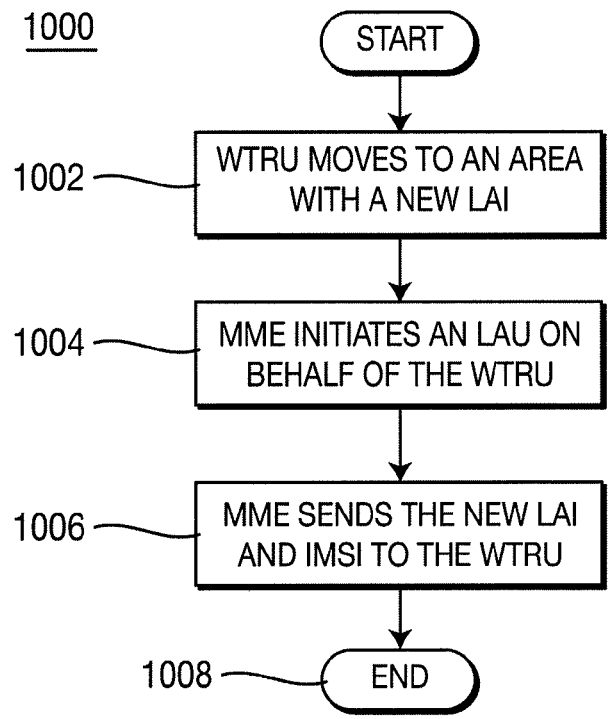
FIG. 10 is a flowchart of a method for triggering a LAU procedure.

FIG. 10 is a flowchart of a method 1000 for triggering a LAU procedure. The method 1000 begins with the WTRU moving into an area with a new LAI (step 1002). The MME initiates an LAU procedure on behalf of the WTRU (step 1004). The MME sends the new LAI and new IMSI to the WTRU (step 1006) and the method terminates (step 1008).

EPS/IMSI Attached

If the WTRU is EPS/IMSI attached and detects a condition for triggering a TAU request, the WTRU combines the TAU request with a LAU request. One condition for triggering the TAU request is when the WTRU enters an area where the TAI is not in the list of TAs previously registered by the WTRU, meaning that the WTRU is entering a new area. When this occurs, the WTRU needs to perform a registration update, which is a combined TAU/LAU procedure.

Paging Identity for the WTRU

The following techniques for determining a paging identity for the WTRU may be used individually or in any combination.

IMSI/TMSI Mapping

The MME may keep a mapping between the IMSI, the TMSI (if allocated), and the corresponding S-TMSI. If the MSC/VLR initiates paging in E-UTRAN for MT services using the IMSI, the MME may map the IMSI to the corresponding S-TMSI. The MME may then page the WTRU in E-UTRAN using the S-TMSI and an indication on the page message of the cause value, such as CS service, CS fallback, MT CS call, MT Short Message Service (SMS), etc. If the WTRU detects that the page message is directed to an identity assigned by upper layers for the WTRU (a TMSI or an IMSI), it initiates an Extended Service Request message on the E-UTRAN network, and sets the cause value for the service request to page response. If the WTRU is re-directed (falls back) to GSM/UMTS CS, the WTRU sends a page response using the IMSI.

Figure 11:
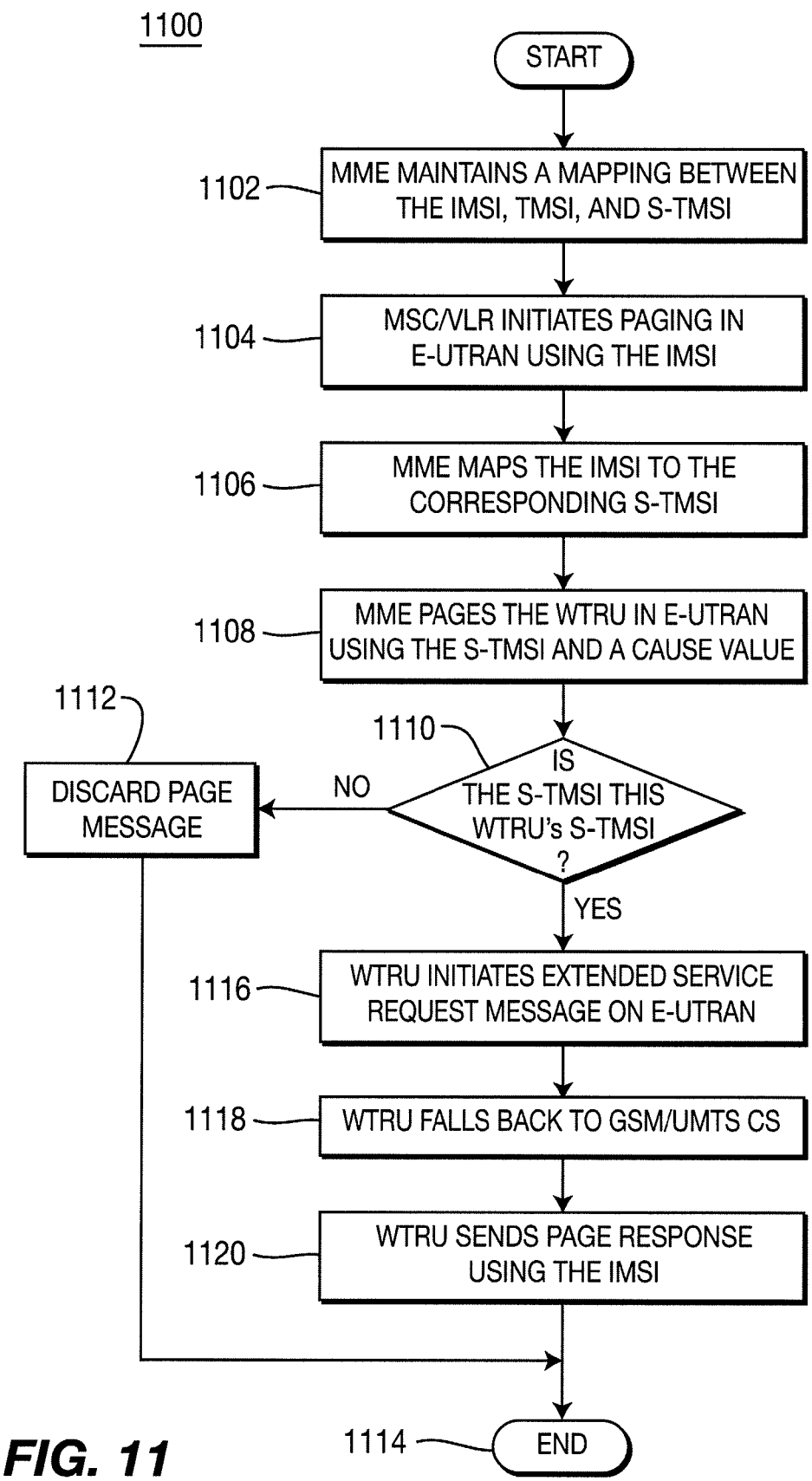
FIG. 11 is a flowchart of a method for determining a paging identity for a WTRU.

FIG. 11 is a flowchart of a method 1100 for determining a paging identity for a WTRU. The MME maintains a mapping between the IMSI, the TMSI, and the S-TMSI (if assigned; step 1102). The MSC/VLR initiates paging of the WTRU in the E-UTRAN using the IMSI (step 1104). The MME maps the IMSI to the corresponding S-TMSI (step 1106). The MME pages the WTRU in the E-UTRAN using the S-TMSI and a cause value (step 1108). A determination is made at the WTRU whether the S-TMSI in the page message is the receiving WTRU's S-TMSI (step 1110). In one embodiment, the WTRU compares the S-TMSI in the page message with the S-TMSI stored at the WTRU, for example, on the Universal Subscriber Identity Module (USIM) card. If the S-TMSI in the page message is not the receiving WTRU's S-TMSI, meaning that the page message is not intended for the receiving WTRU, then the page message is discarded (step 1112) and the method terminates (step 1114).

If the S-TMSI in the page message is the receiving WTRU's S-TMSI (step 1110), then the WTRU initiates an Extended Service Request message on the E-UTRAN (step 1116). The WTRU then falls back to GSM or UMTS for the CS service (step 1118). After completing the fall back to CS, the WTRU sends a page response message using the IMSI (step 1120) and the method terminates (step 1114).

IMSI Paging

If the MSC/VLR initiates paging in the E-UTRAN for MT services using the IMSI, the MME may page the WTRU in the E-UTRAN using the IMSI. If the WTRU detects that the cause for the page message is related to a CS service, for example, CS fallback, a MT CS call, MT SMS, a CS domain indicator, etc., it may not ignore the page request nor detach from the E-UTRAN, but instead initiates an Extended Service Request message on the E-UTRAN network, and sets the cause value for the service request to page response. If the WTRU is re-directed (falls back) to GSM/UMTS CS, the WTRU sends a page response using the IMSI.

Figure 12:
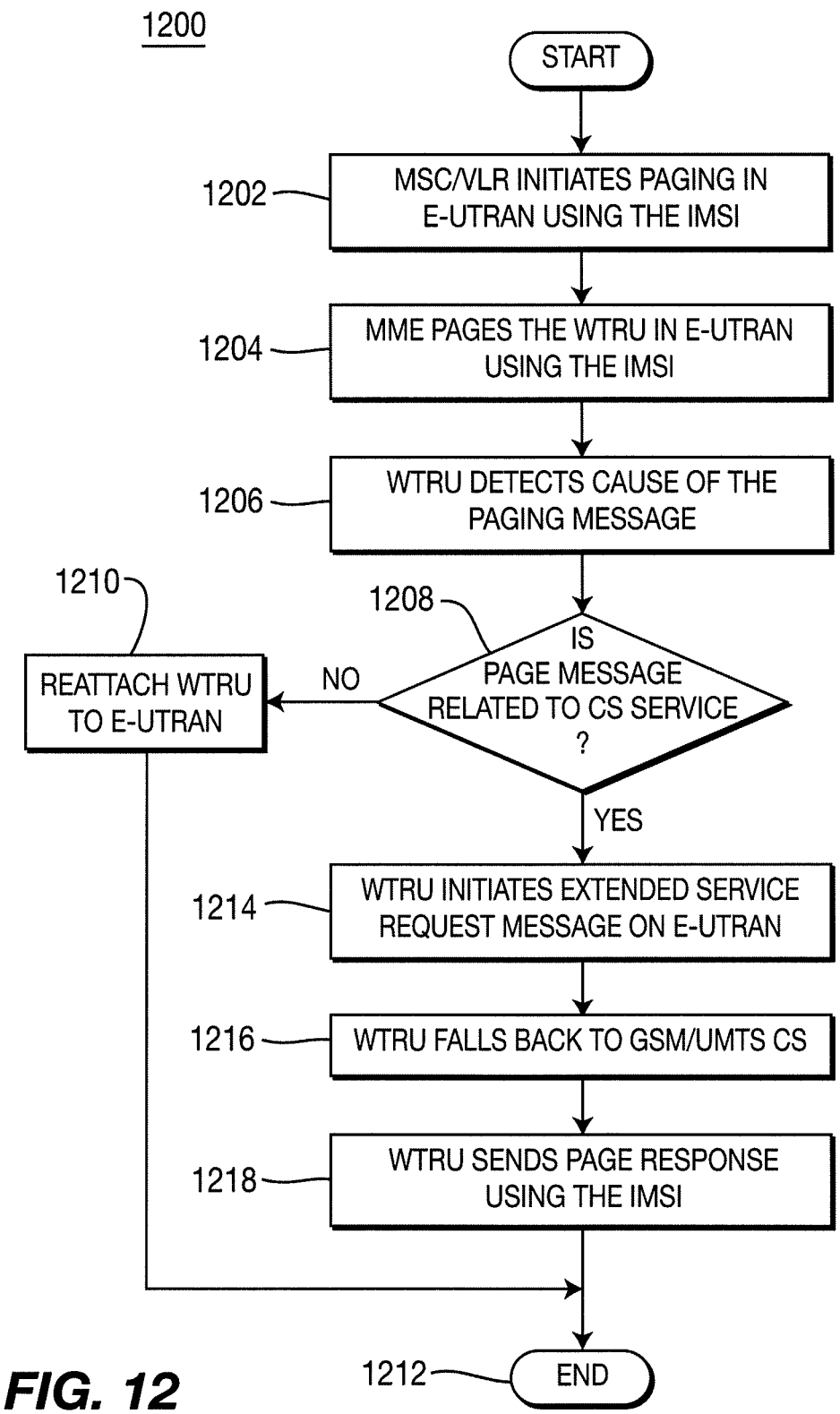
FIG. 12 is a flowchart of a second method for determining a paging identity for a WTRU.

FIG. 12 is a flowchart of a method 1200 for determining a paging identity for a WTRU. The method 1200 begins with the MSC/VLR initiating paging of the WTRU in the E-UTRAN using the IMSI (step 1202). The MME pages the WTRU in the E-UTRAN using the IMSI (step 1204). The WTRU detects a cause value associated with the page message (step 1206) and determines whether the page message is related to a CS service (step 1208). The paging message includes a WTRU identifier (such as the IMSI) and a domain indicator (set to either CS or PS). If the page message is not related to a CS service, meaning that the domain indicator is set to PS, then the WTRU reattaches to the E-UTRAN (step 1210) and the method terminates (step 1212).

If the page message is related to a CS service, meaning that the domain indicator is set to CS (step 1208), then the WTRU initiates an Extended Service Request message on the E-UTRAN (step 1214). The WTRU then falls back to GSM or UMTS for the CS service (step 1216). After completing the fall back to CS, the WTRU sends a page response message using the IMSI (step 1218) and the method terminates (step 1212).

S-TMSI Paging

The MME may keep a mapping between the IMSI, TMSI (if allocated), and the corresponding S-TMSI. If the MSC/VLR initiates paging in E-UTRAN for MT services using the TMSI, the MME map the TMSI to the corresponding S-TMSI. The MME then pages the WTRU in the E-UTRAN using the S-TMSI and includes an indication on the page message of the cause value, such as, CS service, CS fallback, a MT CS call, MT SMS, etc. If the WTRU detects that the page message is directed to an identity assigned by upper layers for the WTRU, it initiates an Extended Service Request message on the E-UTRAN network, and sets the cause value for the service request to page response. If the WTRU is re-directed (falls back) to GSM/UMTS CS, the WTRU sends a page response using the IMSI.

Figure 13:
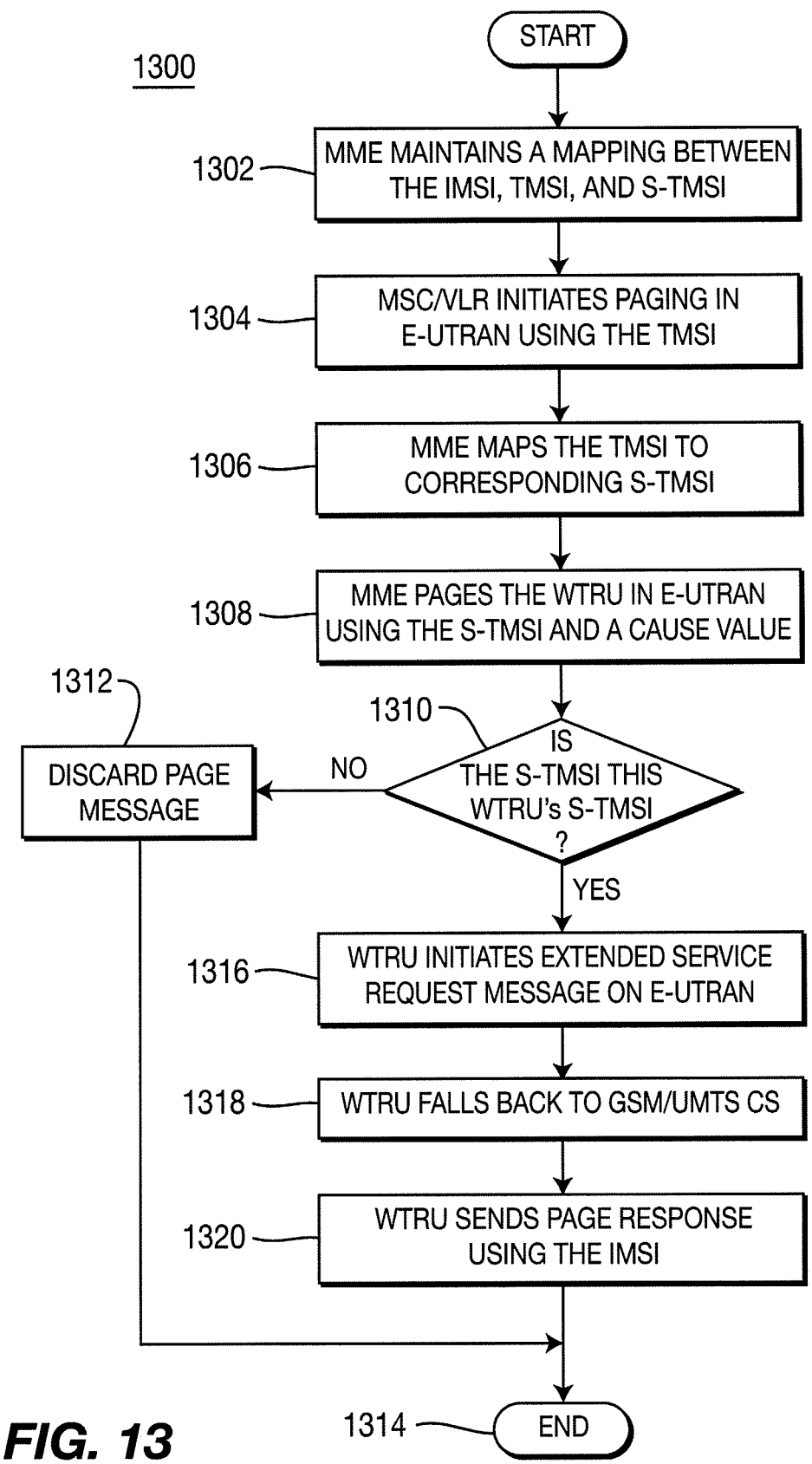
FIG. 13 is a flowchart of a third method for determining a paging identity for a WTRU.

FIG. 13 is a flowchart of a method 1300 for determining a paging identity for a WTRU. The MME maintains a mapping between the IMSI, the TMSI, and the S-TMSI (if assigned; step 1302). The MSC/VLR initiates paging of the WTRU in the E-UTRAN using the TMSI (step 1304). The MME maps the TMSI to the corresponding S-TMSI (step 1306). The MME pages the WTRU in the E-UTRAN using the S-TMSI and includes a cause value in the page message (step 1308). A determination is made at the WTRU whether the S-TMSI in the page message is the receiving WTRU's S-TMSI (step 1310). If the S-TMSI in the page message is not the receiving WTRU's S-TMSI, meaning that the page message is not intended for the receiving WTRU, then the page message is discarded (step 1312) and the method terminates (step 1314).

If the S-TMSI in the page message is the receiving WTRU's S-TMSI (step 1310), then the WTRU initiates a Extended Service Request message on the E-UTRAN (step 1316). The WTRU then falls back to GSM or UMTS for the CS service (step 1318). After completing the fall back to CS, the WTRU sends a page response message using the IMSI (step 1320) and the method terminates (step 1314).

IMSI Paging

The MME may keep a mapping between the IMSI, TMSI (if allocated), and the corresponding S-TMSI. If the MSC/VLR initiates paging in E-UTRAN for MT services using the TMSI, the MME maps the TMSI to the corresponding S-TMSI. The MME then pages the WTRU in the E-UTRAN using the IMSI and includes an indication on the page message of the cause value, for example, CS service, CS fallback, a MT CS call, MT SMS, etc. If the WTRU detects that the page message is directed to an identity assigned by upper layers for the WTRU, it may not ignore the page request nor detach from E-UTRAN, but instead it initiates an Extended Service Request message on the E-UTRAN network, and sets the cause value for the service request to page response. When the WTRU is re-directed (falls back) to GSM/UMTS CS the WTRU sends a page response using the IMSI.

Figure 14:
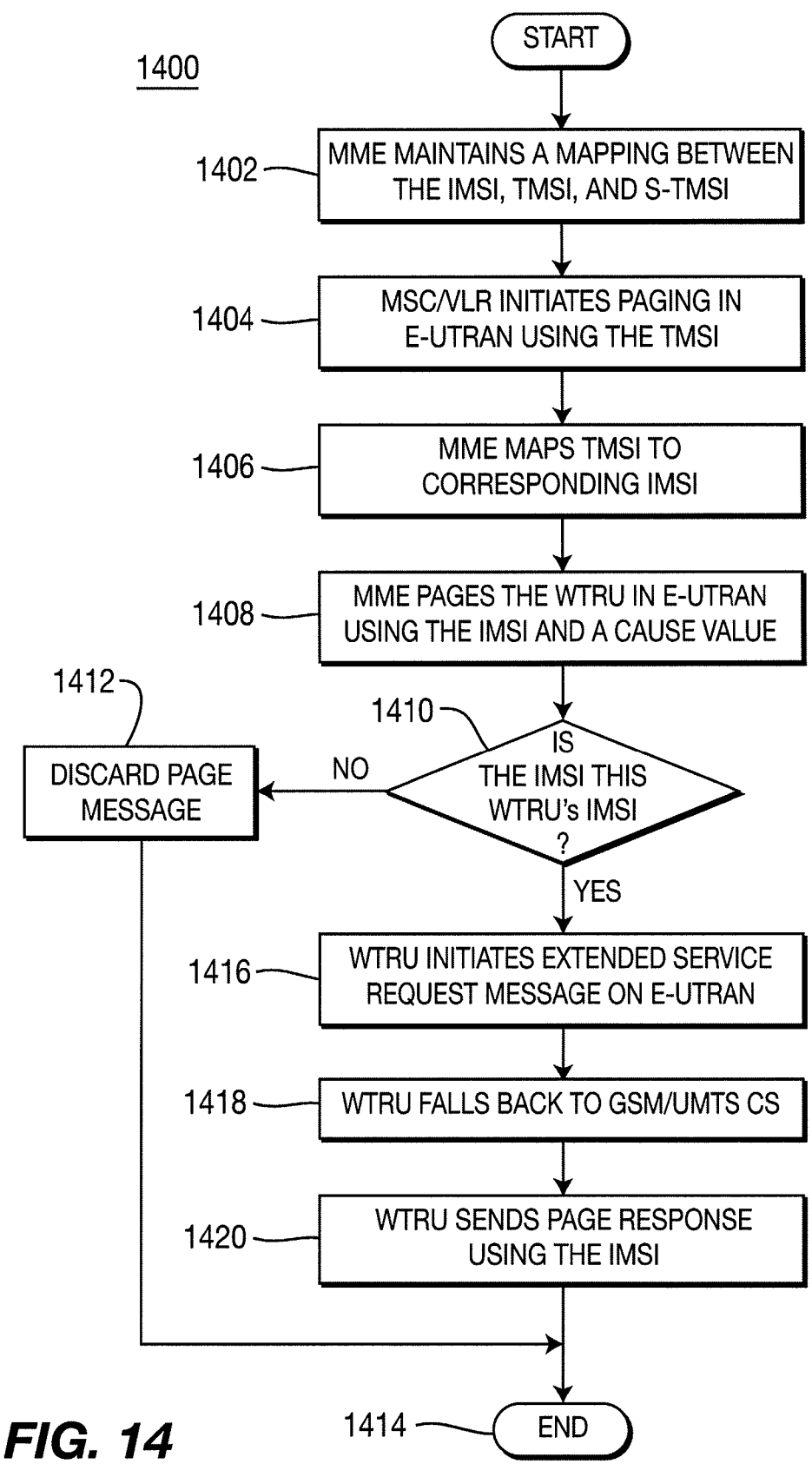
FIG. 14 is a flowchart of a fourth method for determining a paging identity for a WTRU.

FIG. 14 is a flowchart of a method 1400 for determining a paging identity for a WTRU. The MME maintains a mapping between the IMSI, the TMSI, and the S-TMSI (if assigned; step 1402). The MSC/VLR initiates paging of the WTRU in the E-UTRAN using the TMSI (step 1404). The MME maps the TMSI to the corresponding IMSI (step 1406). The MME pages the WTRU in the E-UTRAN using the IMSI and includes a cause value in the page message (step 1408). A determination is made at the WTRU whether the IMSI in the page message is the receiving WTRU's IMSI (step 1410). If the IMSI in the page message is not the receiving WTRU's IMSI, meaning that the page message is not intended for the receiving WTRU, then the page message is discarded (step 1412) and the method terminates (step 1414).

If the IMSI in the page message is the receiving WTRU's IMSI (step 1410), then the WTRU initiates a Extended Service Request message on the E-UTRAN (step 1416). The WTRU then falls back to GSM or UMTS for the CS service (step 1418). After completing the fall back to CS, the WTRU sends a page response message using the IMSI (step 1420) and the method terminates (step 1414).

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method performed by a wireless transmit/receive unit (WTRU), the method comprising:
    receiving, by the WTRU via a packet switched (PS) evolved UMTS terrestrial radio access network (E-UTRAN), a paging message including an International Mobile Subscriber Identity (IMSI) related to the WTRU and a domain indicator indicating that the paging message is associated with a circuit switched (CS) service;
    sending, by the WTRU via the PS E-UTRAN, an extended service request message that indicates CS fallback;
    performing, by the WTRU, fallback to the CS service; and
    responding, by the WTRU via the CS service, to the paging message with the IMSI.

2. The method of claim 1, further comprising:
    discarding, by the WTRU, the paging message on a condition that the IMSI in the paging message does not match a stored IMSI.

3. A wireless transmit/receive unit (WTRU) comprising:
    at least one processor configured to receive, via a packet switched (PS) evolved UMTS terrestrial radio access network (E-UTRAN), a paging message with an International Mobile Subscriber Identity (IMSI) related to the WTRU and a domain indicator with an indication that the paging message is associated with a circuit switched (CS) service;
    the at least one processor configured to send, via the PS E-UTRAN, an extended service request message that indicates CS fallback;
    the at least one processor configured to perform fallback to the CS service; and
    the at least one processor configured to respond, via the CS service, to the paging message with the IMSI.

4. The WTRU of claim 3, further comprising:
    the at least one processor configured to discard the paging message on a condition that the IMSI in the paging message does not match a stored IMSI.

* * * * *

UNITED STATES PATENT AND TRADEMARK OFFICE
CERTIFICATE OF CORRECTION

| | | |
|---|---|---|
| PATENT NO. | : 8,774,173 B2 | Page 1 of 1 |
| APPLICATION NO. | : 13/572113 | |
| DATED | : July 8, 2014 | |
| INVENTOR(S) | : Aghili et al. | |

It is certified that error appears in the above-identified patent and that said Letters Patent is hereby corrected as shown below:

ON THE TITLE PAGE

At item (56) OTHER PUBLICATIONS, page 1, column 2, line 9 of this section, after "Meeting #63," delete "TDq S2-081478" and insert therefor --TD S2-081478 (Feb. 18-22, 2008).--.

At item (56) OTHER PUBLICATIONS, page 2, column 1, line 3 of this section, after "3GPP TS", delete "23060" and insert therefor --23.060--.

At item (56) OTHER PUBLICATIONS, page 2, column 1, line 7 of this section, after "3GPP TS", delete "23060" and insert therefor --23.060--.

At item (56) OTHER PUBLICATIONS, page 2, column 1, line 54 of this section, after the word "Jun.", delete "2008)" and insert therefor --2009)--.

IN THE SPECIFICATION

At column 1, line 9, after the word "which", delete "issue" and insert therefor --issued--.

At column 2, line 40, after the word "GMSC 214", delete "receives" and insert therefor --receiving--.

At column 3, line 7, after the word "WTRU", delete "206" and insert therefor --202--.

At column 3, line 9, after the word "indicate", insert --to--.

At column 3, line 55, after "at the", delete "RNC" and insert therefor --RNC/BSC--.

At column 4, line 1, after "at the", delete "BSC" and insert therefor --RNC/BSC--.

At column 11, line 4, after the word "initiates", delete "a" and insert therefor --an--.

At column 11, line 42, after the word "initiates", delete "a" and insert therefor --an--.

Signed and Sealed this
Ninth Day of August, 2016

Michelle K. Lee
*Director of the United States Patent and Trademark Office*